3,331,796
LOW GLOSS WAX ETHYLENE VINYL ACETATE COPOLYMER-MODIFIED POLYESTER COATING COMPOSITION

Harry E. Gilbert, Jr., Pittsburgh, William J. Snyder, Jr., New Kensington, and William G. Zundel, McKeesport, Pa., assignors to Pittsburgh Plate Glass Company, Pittsburgh, Pa., a corporation of Pennsylvania
No Drawing. Filed Nov. 12, 1963, Ser. No. 323,141
8 Claims. (Cl. 260—28.5)

This invention relates to novel polyester resins which cure in air at low temperatures to give a hard, low-gloss, tack-free surface. More particularly, this application relates to compositions comprising (1) an unsaturated polyester of an unsaturated polycarboxylic acid, optionally a saturated or aromatically unsaturated polycarboxylic acid, and polyol; (2) an unsaturated monomer copolymerizable with the polyester; and (3) a mixture of a wax and a copolymer of ethylene and vinyl acetate.

It is known that unsaturated polyester resins comprising a polyester of an unsaturated polycarboxylic acid and a polyol, and an ethylenically unsaturated monomer, such as styrene, vinyl toluene, vinyl acetate, methyl methacrylate, and the like, cure to a hard, tack-free condition in the substantial absence of oxygen. In casting applications, oxygen is excluded by curing the unsaturated polyester in a closed mold. In coating applications, oxygen is excluded by including in the resin small quantities of a wax, such as paraffin wax, beeswax, carnauba wax and the like, which is compatible with the polymerizable polyester-monomer mixture, but incompatible with the cured resin. The wax exudes to the surface of the resin as curing, i.e., polymerization between the unsaturated polyester and unsaturated monomer, occurs. It is believed that the exuded wax on the surface permits the resin to cure to a tack-free surface by excluding oxygen from the polymerizable ingredients while curing is taking place and by preventing evaporation of the unsaturated monomer from the surface of the resin. Evaporation is believed to result in less cross-linking, which results in an undercured, tacky surface. In British Patent No. 774,807 and in "Polyester Resins" by John R. Lawrence, Reinhold (1960), at page 178, the preparation of tack-free surfaces from unsaturated polyester resins containing a wax is described in detail.

While wax-containing polyester coatings are extremely useful in numerous applications, it has been discovered that low-gloss surfaces cannot be readily prepared from such compositions. This is a serious disadvantage inasmuch as low-gloss surfaces are in great demand for interior decoration of buildings, furniture and the like. Glosses in the order of 5 percent to 15 percent gloss, as measured by a 60° Gardner glossmeter, are considered low-gloss surfaces.

Attempts to prepare low-gloss polyesters containing wax by extending the curing time to about 60 minutes through the use of low-catalyst content, high inhibitor content and low temperatures have been unsatisfactory. First, the long curing time makes such a process commercially infeasible. Secondly, and more importantly, the gloss is extremely non-uniform as even slight variation in the process conditions, especially temperature, drastically affect the final gloss. This is particularly serious as frequently these resins are cured at room temperature, which varies from hour to hour.

Flatting agents, such as zinc palmitate, zinc stearate, aluminum stearate and the like, have been tried unsuccessfully to produce a stable, polymerizable unsaturated polyester composition which will give a hard, low-gloss, tack-free surface upon curing. Zinc stearate, zinc palmitate and the like yield a low-gloss surface; however, polymerizable unsaturated polyesters containing such flatting agents tend to gel prematurely, thereby rendering such compositions unsuitable for commercial utility because of storage unstability.

However, it has now been discovered that stable, unsaturated polyester resin coating compositions which cure to a hard, mar-resistant, low-gloss, tack-free condition in a normal cure cycle, i.e., at temperatures of about 60° F. to about 350° F. in about 10 minutes to about 30 minutes, and which are relatively unaffected by variations in process conditions, can be prepared by adding a small quantity of wax and a copolymer of ethylene and vinyl acetate to a conventional unsaturated polyester resin. It is surprising that the combination of these ingredients produces a low-gloss luster on the surface of a cured unsaturated polyester resin inasmuch as neither the wax nor the ethylene-vinyl acetate copolymer alone produce this effect under normal curing conditions. Also, mixtures of wax, polyethylene homopolymer and polyvinyl acetate homopolymer do not produce low-gloss when added to unsaturated polyester resin coatings.

It is further surprising that the novel low-gloss surface is achieved by the addition of small quantities of these ingredients. Generally, quantities as low as about 0.1 percent by weight to about 1.0 percent by weight of the wax, and about 0.01 percent by weight to about 0.3 percent by weight of the ethylene-vinyl acetate copolymer are utilized. It is preferred, however, to utilize about 0.2 percent by weight to about 0.8 percent by weight of the wax and about 0.02 percent by weight to about 0.2 percent by weight of the ethylene-vinyl acetate copolymer, based upon the total weight of the polyester resin. The weight ratio of wax to ethylene-vinyl acetate copolymer may be from about 15:1 to about 3:1.

A further advantage of the above system resides in the ability of the wax and ethylene-vinyl acetate copolymer to produce the desired effect when added as a mixture to either the unsaturated polyester component, the ethylenically unsaturated monomer or the polymerizable mixture of these two components. Also, the wax and ethylene-vinyl acetate copolymer may be added as a mixture, or each ingredient may be added separately to either component or to the polymerizable mixture of components. Furthermore, the wax and/or ethylene-vinyl acetate copolymer may be added during or before the esterification of the carboxylic acid and polyol to form the unsaturated polyester. The preferred method of adding the wax and the ethylene-vinyl acetate copolymer, however, is to add a heated mixture thereof to the ethylenically unsaturated monomer.

In the preparation of low-gloss, pigmented polyester coatings, it is preferred to add a mixture of the wax and ethylene-vinyl acetate copolymer in monomer, e.g., styrene, methyl methacrylate, and the like, immediately after the initial dispersion of pigments in the polyester component, however, any method of adding these ingredients to the polymerizable unsaturated polyester resin is effective so long as good distribution is achieved and polymerization has not substantially begun.

Polyester component

The unsaturated polyesters useful in the present invention are of a conventional type, i.e., the products of an unsaturated polycarboxylic acid and a polyol. They can be prepared by reacting said acid or acids with a polyol or polyols to effect esterification and evolution of water in a conventional manner in the presence of an azeotroping solvent, such as described in "Polyester Resins" by John R. Lawrence, Reinhold (1960), at pages 78 through 87, or by a fusion method wherein esterification is conducted in the absence of solvents.

The ratio of polycarboxylic acid to polyol is usually a 1:1 molar ratio. However, in most esterification processes, a slight excess of polyol is utilized to compensate for polyol losses during esterification. Also, although dicarboxylic acids and diols are most frequently utilized and the 1:1 molar ratio is prevalent, the utilization of triols and the like requires the ratio of acid to polyol to be stated more precisely as one equivalent of acid per equivalent of polyol.

The unsaturated polyesters useful in this invention may be prepared from an acid mixture wherein the unsaturated polycarboxylic acid comprises as little as 20 mole percent of the total acids present, although it is generally preferred that the unsaturated polycarboxylic acid comprise about 30 percent or more of the total acid content.

Some of the unsaturated polycarboxylic acids useful in preparing unsaturated polyesters used in this invention include:

Maleic acid
Fumaric acid
Itaconic acid
Mesaconic acid
Citraconic acid
Glutaconic acid
Chloromaleic acid and the like, wherein the term "acid" is used to include the corresponding anhydrides where such anhydrides exist.

Some of the saturated and aromatically unsaturated polycarboxylic acids optionally useful in preparing unsaturated polyesters used in this invention include:

Phthalic acid
Isophthalic acid
Tetrahydrophthalic acid
Hexahydrophthalic acid
Endomethylene tetrahydrophthalic acid
Tetrachlorophthalic acid
Hexachloroendomethylene tetrahydrophthalic acid
Succinic acid
Glutaric acid
Adipic acid
Suberic acid
Sebacic acid and the like, wherein the term "acid" includes the corresponding anhydrides where such anhydrides exist. The >C=C< groups of the aromatic unsaturated polycarboxylic acids are relatively unreactive and do not participate to any substantial degree in polymerization reactions occurring between the unsaturation groups of the polyester, as provided by the alpha, beta-ethylenically unsaturated acid present, such as maleic acid, and the ethylenically unsaturated monomer, such as styrene. Although the aromatic unsaturated acids are more conventionally used in polyester coating compositions than the saturated polycarboxylic acids, the latter do contribute flexibility to such coating compositions. Therefore, saturated polycarboxylic acids may be included as a reactant in preparing polyester coating compositions to improve the flexibility of the cured coating.

Polyols useful in preparing polyesters for use in coating compositions of this invention are polyfunctional alcohols of the type conventionally utilized in polyester preparation. Such polyols include:

Ethylene glycol
Propylene glycol
Butylene glycol
Diethylene glycol
Trimethylolpropane
Dipropylene glycol
2,2-bis(4-hydroxyphenyl)propane
Triethylene glycol
Glycerol
1,4,6-hexanetriol
Trimethylolethane
Pentaerythritol
Neopentyl glycol and the like. Although diols are generally preferred in the preparation of unsaturated polyesters intended for use in coating compositions, the more functional polyols, i.e., polyols having a functionality of about four, are frequently used, especially in the preparation of polyester coatings having exceptional hardness. Also, allyl ethers of polyols, e.g., the diallyl ether of trimethylol propane, are frequently used to improve the air-drying characteristics of unsaturated polyester resins.

*Unsaturated monomer component*

In preparing unsaturated polyester resins, it is general practice to solubilize the unsaturated polyester in a reactive solvent, preferably a liquid unsaturated monomer containing a $CH_2=C<$ group, whereby, under proper conditions, the mixture can be polymerized to a hard, thermoset condition. The term "thermoset" is used to describe a fused, cross-linked condition which may or may not be induced by application of heat as some of the resins utilized in this invention cure to a cross-linked condition at room temperatures. The unsaturated monomers utilized in preparing unsaturated polyester resins useful in this invention include vinyl substituted mononuclear aromatic hydrocarbons and halo and alkyl derivatives thereof, alkyl esters of alpha, beta-ethylenically unsaturated monocarboxylic acids and halo derivatives thereof, and allyl esters and ethers, the following compounds being illustrative:

Styrene
Vinyl toluene
Alpha-methyl styrene
Divinyl benzene
Methyl methacrylate
Dichlorostyrene
Diallyl phthalate
Triallyl cyanurate
Diester of phthalic acid and the diallyl ether of trimethylol propane and the like. Styrene is the preferred monomer inasmuch as it is the most reactive at low temperatures, thereby providing unsaturated polyester resins which cure rapidly at low temperatures to form a hard coating.

In most instances, the unsaturated polyester is blended with the unsaturated monomer while the polyester is still hot, i.e., about 150° F. Hot blending improves the solubilizing of the two components. To prevent gelation during blending and during subsequent storage, it is common practice to add an inhibitor to either one or both of the components prior to blending. Suitable inhibitors include hydroquinone, pyrogallol, t-butyl catechol, aniline, phenylene diamine and quaternary ammonium salts, as disclosed in United States Patent No. 2,593,787.

As indicated above, proper conditions are required to effect polymerization of the unsaturated monomer with the unsaturated polyester. Proper conditions generally include presence of polymerization catalysts, elevated temperature, and, desirably, absence of oxygen. As mentioned above, waxes of various types are added to polyester coating compositions to exclude oxygen. The proper temperature for curing unsaturated polyesters designed for coating compositions is about 60° F. to about 350° F., although for reasons of economy it is generally desired to use the lowest possible temperature commensurate with a fast and acceptable cure. Typical polymerization catalysts for initiating and catalyzing polymerization between an unsaturated polyester and an unsaturated monomer used in preparing polyester resins useful in this invention include:

Benzoyl peroxide
Lauroyl peroxide
2,4-dichlorobenzoyl peroxide
Caprylyl peroxide
Acetyl peroxide
Methyl ethyl ketone peroxide
Cumene hydroperoxide
t-Butyl hydroperoxide
Di-t-butyl peroxide and the like. A more comprehensive listing can be found in "Polyester Resins" by John R. Lawrence, Reinhold (1960), at pages 96 and 97. Also, the relative activity of various catalysts is disclosed in said reference, thereby enabling one practicing this invention to choose a proper catalyst dependent upon the curing temperature.

While the above listed catalysts may be used without accelerators, it is conventional practice in the polyester art to utilize accelerators to hasten the curing of the resin. Suitable accelerators for use with the above catalysts include:

Cobalt naphthenate  Dimethyl aniline
Manganese naphthenate  Dodecyl mercaptan
Diethyl aniline and the like. In "Polyester Resins," op cit., at pages 100 through 104, is a thorough discussion of accelerators and suggestions as to preferred combinations of accelerators and catalysts.

It is conventional practice to add polymerization catalysts and accelerators to an unsaturated polyester resin coating composition just prior to its application on a substrate.

Wax component

In formulating unsaturated polyester resin coating compositions which cure to a hard, low-gloss, tack-free coating, the addition of a wax and an ethylene-vinyl acetate copolymer has been found to be essential. The wax component useful in this invention is of the type conventionally used in polyester coating compositions for excluding air from the surface of the polyester.

It is to be understood that the term "wax" as used herein includes not only the naturally occurring materials which are composed largely of fatty acid esters of high molecular weight monohydric alcohols, such as carnauba, cancellila and beeswax, but also organic water-insoluble materials which have the general characteristics of waxes. A wax, by this definition, is a substance, usually complex, which is of amorphous or micro-crystalline structure and usually lacking excessive "tack" at normal temperature, and which melts fairly sharply to give a mobile liquid at a temperature but little higher than its normal melting point.

The hydrocarbon waxes, often referred to as mineral waxes, including paraffin, montan, ozokerite and ceresin, are preferred waxes for use in preparing air-curing polyester resin compositions of this invention, especially those hydrocarbon waxes having a melting point of about 125° F. to about 140° F. Certain other waxy materials, such as micro-crystalline waxes, petrolatum wax, and sugar cane wax are also useful as additives for providing air-curing polyester resin compositions.

A comprehensive treatise on waxes is "Commercial Waxes" by H. Bennett, Chemical Publishing Company (1944). In that text can be found the properties and sources of the above-mentioned waxes.

Ethylene-vinyl acetate copolymer

An essential ingredient in the preparation of the novel coating compositions of this invention is a copolymer of ethylene and vinyl acetate having an ethylene to vinyl acetate weight ratio of between 4:1 and 2:1, i.e., a vinyl acetate content of between about 20 percent by weight and 35 percent by weight of the polymer weight.

Copolymers of ethylene and vinyl acetate may be prepared by an oxygen or peroxide catalyzed polymerization of a suitable blend of monomers at moderately elevated temperatures under pressures ranging upwards of 100,000 pounds per square inch. Varying conditions of temperature, pressure, and reactant concentrations, as well as type and amount of catalyst, will give copolymers of varying molecular weight, polymerized vinyl acetate content and melt index. Copolymers having a melt index of from about 10 to about 30 have proven useful in the compositions of this invention, although a melt index of about 15 to about 25 is preferred. The melt index is determined in accordance with ASTM D–1238–57T procedures.

Preparation of low-gloss polyester coating

The following procedure illustrates one method of preparing a low-gloss polyester coating, however, variations of this process can be practiced in accordance with the above disclosure and conventional polyester processing techniques.

(1) An unsaturated polyester resin, such as the reaction product of a 50/50 mixture of maleic acid and phthalic acid with an equal number of equivalents of ethylene glycol, is blended with an unsaturated monomer, such as styrene, so that the polyester is present in a weight ratio of about 80:20 to about 40:60 to the styrene, the preferred weight ratio being about 60:40, polyester to styrene. As mentioned above, it is desirable to have a suitable inhibitor, such as hydroquinone, present during blending.

(2) A mixture of a wax, preferably a paraffin wax having a melting point of between about 125° F. and 140° F., and an ethylene-vinyl acetate copolymer of the type described above, are heated to about 125° F. to about 200° F. and admixed with an unsaturated polyester resin, preferably while the resin is still warm. The hot mixture of wax and copolymer is preferably added to the unsaturated monomer prior to blending. The ratio of wax to copolymer is preferably about 3.5 to 1 to about 9 to 1, although as mentioned hereinabove, various other ratios are useful. The total quantity of wax-copolymer mixture added is preferably about 0.2 percent by weight to about 1.0 percent by weight of the polyester resin weight; however, as mentioned hereinabove, smaller and greater quantities can be utilized.

(3) Prior to applying the unsaturated polyester resin-wax-copolymer composition, a small amount, generally about 0.5 percent by weight to about 5 percent by weight, of a suitable catalyst, such as benzoyl peroxide or other suitable peroxide such as those described hereinabove, is added to the coating composition. Also, a small amount of an accelerator or a combination of accelerators, generally about 0.1 percent by weight to about 1 percent by weight, of the type described above, for example cobalt naphthenate, is added to the coating composition.

(4) The catalyzed coating composition is applied to a surface by a conventional technique, such as spraying, brushing, curtain-coating and similar methods. The liquid coating is then cured by subjection to temperatures in the range of about 60° F. to about 350° F. or higher, the higher temperatures effecting curing in less time. For reasons of economy, the preferred curing temperature range is about 60° F. to about 150° F.

The resuling polyester coating has a hard, tack-free surface having a lower, more uniform gloss than is attainable by conventional techniques. The surface has a gloss range of about 5 percent to about 15 percent reflectance as measured on a 60° glossmeter. Conventional air-curing unsaturated polyester coatings have a gloss range of about 25 percent to about 60 percent.

The novel formulations of this invention may be prepared as either pigmented or non-pigmented coating compositions, as the low-gloss effect is achieved in each case. Pigmented low-gloss coatings may be prepared by utilizing pigments conventionally used for polyester coatings and processing the pigmented coating composition in a conventional manner.

The novel coating compositions of this invention may be applied effectively to numerous types of substrates such as wood, metal, glass, masonry, and various other surfaces such as plasterboard, hardboard, plywood, synthetic plastics, and the like.

The following examples illustrate in detail the embodiments of this invention. The examples are not intended to limit the invention, however, for there are, of course, numerous possible variations and modifications.

In the following examples, the symbol EVA is used to designate an ethylene-vinyl acetate copolymer of 70 percent by weight ethylene and 30 percent by weight of vinyl acetate. The wax used in the following examples was a paraffin wax having a melting point of about 125° F. to about 135° F.

EXAMPLE I

A typical unsaturated polyester resin useful in coating compositions of this invention was prepared as follows:

|  | Moles |
|---|---|
| Phthalic anhydride | 6.0 |
| Maleic anhydride | 4.0 |
| Propylene glycol | 8.02 |
| Diethylene glycol | 2.76 |

The above ingredients were added to a reaction vessel equipped with a stirrer, reflux condenser and temperature measuring means, and heated to a temperature of about 400° F. under a purge of inert gas until an acid value of 30 to 40 and a Gardner-Holt viscosity of F to H were obtained.

After the polyester was cooled to about 200° F., styrene was added in proportions of 65 parts polyester to 35 parts styrene. The styrene contained an appropriate inhibitor, such as about 0.02 parts hydroquinone, and about 0.042 parts of paraffin wax. The paraffin wax was a hydrocarbon wax having a melting point of about 125° F. to about 135° F.

The resulting polyester resin had a viscosity of about 600 centipoise to about 750 centipoise.

EXAMPLE II

A green, low-gloss coating was prepared in the following manner:

To 70 parts of the polyester resin of Example I were added 30 parts of a pigment mixture having the following composition:

|  | Percent by weight |
|---|---|
| Titanium dioxide | 23 |
| Calcium carbonate | 45 |
| Silica extender pigments | 23 |
| Chrome oxide green | 9 |

The pigmented resin was then admixed in a ball mill until a homogenous mixture resulted.

To 100 parts of pigmented resin were added 10 parts of a solution of the following composition:

9.5 parts of styrene
0.5 parts of a wax-EVA mixture of 80/20 weight ratio, that is, 80 parts wax to 20 parts EVA.

About 2 percent by weight of 55 percent benzoyl peroxide paste, about 0.12 percent by weight of cobalt naphthenate and about 0.18 percent by weight of dimethyl aniline, based on the weight of pigmented resin, were added to the resin-wax-EVA coating composition.

The coating composition was sprayed on a plywood panel and air-dried at room temperature for about 30 minutes. The cured coating had a gloss of 12 percent as measured by a 60° glossmeter. Conventional wax-containing polyester coating compositions have a gloss of about 25 percent to about 35 percent, as measured by a 60° glossmeter, when cured under similar conditions.

EXAMPLE III

A yellow, low-gloss coating was prepared in a manner similar to Example II using 70 parts of resin from Example I and 30 parts of a pigment mixture having the following composition:

|  | Percent by weight |
|---|---|
| Titanium dioxide | 24 |
| Calcium carbonate | 48 |
| Silica extender pigments | 24 |
| Yellow iron oxide | 4 |

This mixture was admixed as in Example II and had an identical amount of wax-EVA mixture added. Similar quantities of the same catalyst and accelerators were added.

The coating composition was brushed on a panel and air-dried at room temperature for about 30 minutes. The cured film had a gloss of 12 percent as measured by a 60° glossmeter.

EXAMPLE IV

Five gallons of a yellow polyester coating composition of the type used in Example II and containing 0.06 lbs. of wax was modified with 300 grams of a 5 percent wax-EVA copolymer mixture in styrene. (Density of the polyester coating composition was about 7.5 lbs./gal.).

Two samples of the modified polyester composition were prepared, one (Sample A) containing 2 percent by weight of 55 percent benzoyl peroxide paste, the other (Sample B) containing 3 percent by weight of 55 percent benzoyl peroxide paste, based on the total weight of the resin. Each sample contained about 0.18 percent by weight of dimethyl aniline and about 0.12 percent by weight of cobalt naphthenate, based on the total weight of resin. Each sample was cured at room temperature.

Sample A had a gel time of about 10 minutes and an 8 mil film cured in 26 minutes to a 14 percent gloss as measured by a 60° glossmeter.

Sample B had a gel time of about 7 minutes and an 8 mil film cured in 30 minutes to a 14 percent gloss as measured by a 60° glossmeter.

EXAMPLE V

The effect of various quantities of mixtures of wax and EVA were determined in the following manner:

(A) A five gallon sample of the yellow polyester coating composition of Example III containing 0.06 pounds of wax and 3 percent by weight of 55 percent benzoyl peroxide paste, 0.18 percent by weight of dimethyl aniline and 0.12 percent by weight of cobalt naphthenate, was applied by curtain coating technique. The resulting film cured at room temperature in about 30 minutes to a gloss which ranged from about 24 percent to about 28 percent as measured by a 60° glossmeter.

(B) To a similar five gallon sample of the above resin containing 0.06 pound of wax and comparable quantities of catalyst and accelerators, were added about 350 grams of a styrene solution containing about 35 grams of wax-EVA mixture. The composition was applied by curtain coating techniques and air-dried for 25 minutes. The resulting film had a gloss of 14 percent as measured by a 60° glossmeter.

(C) Another five gallon sample of coating composition was utilized in the manner of sample (B), however, the 350 grams of styrene solution contained about 70 grams of wax-EVA mixture. The final gloss after the film cured at room temperature for 25 minutes was 14 percent as measured by a 60° glossmeter.

(D) Another five gallon sample of coating composition was utilized in the manner of sample (B), however, 1 percent by weight of styrene was added. The viscosity of the composition was reduced from 30 seconds to 25 seconds as measured by a #4 Ford cup. The composition otherwise containing the same amount of wax-EVA mixture, catalyst and accelerators. The final gloss after the film air-dried at room temperature for 25 minutes was about 12 percent to about 15 percent as measured by a 60° glossmeter.

EXAMPLE VI

Various samples of a polyester of the type prepared in Example I were prepared containing various ratios of wax to EVA copolymer. Each sample contained about 2 percent by weight of 55 percent benzoyl peroxide paste, about 0.12 percent by weight of cobalt naphthenate, and about 0.18 percent by weight of dimethyl aniline. Each sample was coated upon hardboard and air-dried for about 30 minutes.

The following samples had a gloss range of 5 percent to 15 percent as measured by a 60° glossmeter.

EXAMPLE VI

| Parts by Weight | | | Ratio (Paraffin Wax/EVA) |
|---|---|---|---|
| Resin | Paraffin Wax | EVA Copolymer | |
| 100 | 0.28 | 0.08 | 3.5 to 1 |
| 100 | 0.32 | 0.08 | 4 to 1 |
| 100 | 0.24 | 0.041 | 6 to 1 |
| 100 | 0.356 | 0.044 | 8 to 1 |
| 100 | 0.362 | 0.038 | 9 to 1 |

The following samples each had a gloss of greater than 20 percent as measured by a 60° glossmeter.

| Parts by Weight | | | Ratio (Paraffin wax/EVA) |
|---|---|---|---|
| Resin | Paraffin Wax | EVA Copolymer | |
| 100 | 0.2 | 0.08 | 2.5 to 1 |
| 100 | 0.38 | 0.02 | 19 to 1 |

Similar results are obtained when montan, ozokerite, ceresin, carnauba, beeswax, and petrolatum waxes are substituted for the paraffin wax in the above examples.

Although specific examples have been set forth hereinabove, it is not intended that the invention be limited solely thereto, but to include all of the variations and modifications falling within the scope of the appended claims.

We claim:
1. A coating composition which air-cures to a hard, tack-free, low-gloss condition of from about 5 to 15 percent gloss as measured by a 60° Gardner glossmeter, comprising:
 (a) an unsaturated polyester comprising the reaction product of an alpha, beta-ethylenically unsaturated polycarboxylic acid and a polyol;
 (b) a liquid ethylenically unsaturated monomer copolymerizable with said polyester;
 (c) a wax in amounts of from about 0.1 percent to 1 percent by weight of the polyester resin; and
 (d) a copolymer of ethylene and vinyl acetate wherein the copolymer has an ethylene to vinyl acetate weight ratio of between 4:1 and 2:1 and is present in amounts of from about 0.01 to 0.3 percent by weight, based on the weight of the polyester resin.
2. The composition of claim 1 wherein the ethylenically unsaturated monomer is seleced frotm the class consisting of styrene, vinyl toluene, alpha-methyl styrene, divinyl benzene, methyl methacrylate and mixtures thereof.
3. The composition of claim 1 wherein the wax is a paraffin wax.
4. A coating composition which air-cures to a hard, tack-free, low-gloss condition of from about 5 to 15 percent gloss as measured by a 60° Gardner glossmeter, comprising:
 (a) an unsaturated polyester comprising the reaction product of an alpha, beta-ethylenically unsaturated polycarboxylic acid selected from the class consisting of maleic acid, fumaric acid and itaconic acid, an aromatic unsaturated polycarboxylic acid selected from the class consisting of phthalic acid and isophthalic acid, and a polyol selected from the class consisting of ethylene glycol, propylene glycol, butylene glycol, diethylene glycol, dipropylene glycol and triethylene glycol;
 (b) an ethylenically unsaturated monomer polymerizable with said polyester;
 (c) a paraffin wax in amounts of from about 0.1 percent to 1 percent by weight of the polyester resin; and
 (d) a copolymer of ethylene and vinyl acetate, having a vinyl acetate content in the range of about 20 percent by weight to about 35 percent by weight, being present in amounts of from about 0.01 to 0.3 percent by weight, based on the weight of the polyester resin.
5. The composition of claim 4 wherein the ethylenically unsaturated monomer is selected from the class consisting of styrene, vinyl toluene, alpha-methyl sytrene, divinyl benzene, methyl methacrylate, and mixtures thereof.
6. The composition of claim 5 wherein the paraffin wax is present in a range of about 0.2 percent by weight to about 0.8 percent by weight of the composition.
7. The composition of claim 6 wherein the EVA copolymer is present in a range of about 0.02 percent by weight to about 0.2 percent by weight of the composition.
8. The composition of claim 7 wherein the weight ratio of paraffin wax to ethylene-vinyl acetate copolymer is in the range of about 3 to 1 to about 15 to 1.

References Cited

UNITED STATES PATENTS 2,877,196  3/1959  Reding.

FOREIGN PATENTS 774,807  5/1957  Great Britain.

MORRIS LIEBMAN, *Primary Examiner.*

J. FROME, *Assistant Examiner.*